Aug. 6, 1929.　　　P. F. KRENZKE　　　1,723,941
MOLD CONVEYER
Filed April 27, 1928
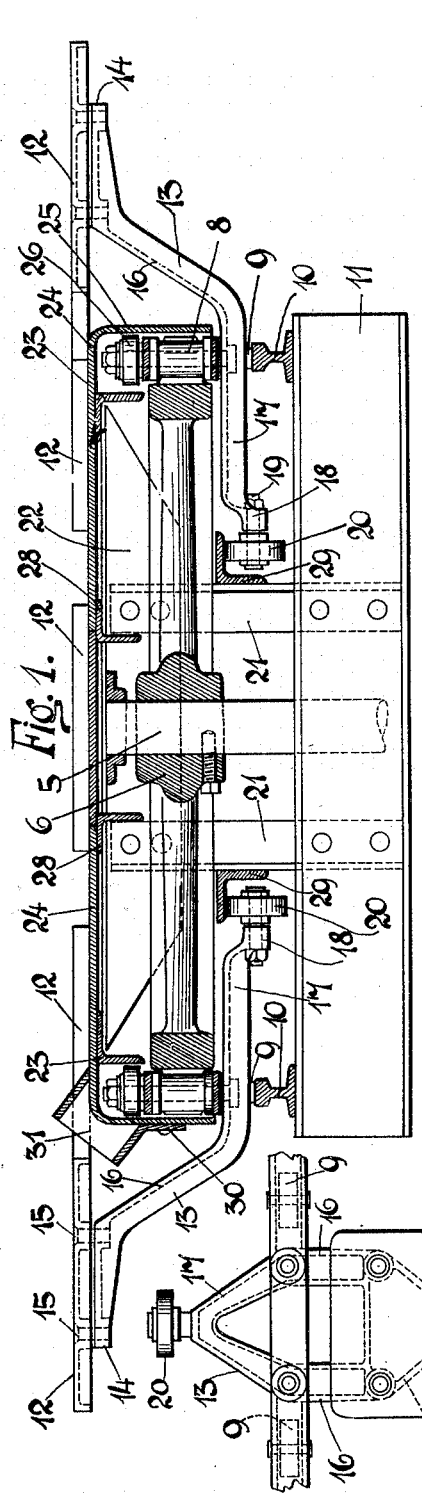
Paul F. Krenzke.
INVENTOR.
BY Erich H. Michaelis
ATTORNEY.

Patented Aug. 6, 1929.

1,723,941

UNITED STATES PATENT OFFICE.

PAUL F. KRENZKE, OF CHICAGO, ILLINOIS.

MOLD CONVEYER.

Application filed April 27, 1928. Serial No. 273,226.

The invention relates to foundry machinery and more especially to that type of foundry machine known under the name of mold conveyer.

The object of the invention is to provide a mold conveyer having a plurality of trays for supporting the molds, which may be arranged pretty close together without interfering with each other when the conveyer is set in motion.

A further object of the invention is to provide a mold conveyer constructed in such a manner, that the moving parts of said conveyer are protected against entrance of molding sand, hot metal, or other foreign matter, which would cause said moving parts to wear out quickly or to burn away.

A still further object of the invention is to provide a mold conveyer of which the trays and the chains connecting said trays are so constructed and arranged, that it is possible to use comparatively small sprocket gears for guiding said chain whereby the space occupied by the conveyer is greatly reduced.

Another object of the invention is to provide a mold conveyer constructed in such a manner, that it is possible to utilize the space between the conveyer chains, for instance as a storage place of core prints and the like.

A still further object of the invention is to provide a mold conveyer constructed in such a manner, that the biggest part of the load is supported on rollers, whereby the friction is greatly reduced, which in turn makes it possible to use a comparatively small and light chain.

The objects of the invention not specifically mentioned may be easily ascertained and understood from the followingg description in connection with the drawings forming a part thereof. It is however to be noted that the invention is not to be limited or restricted to the exact construction and formation described in the specification and shown in the drawings, but that said invention is only to be limited by the scope of the claims appended hereto.

In the drawings illustrating a preferred form of the invention:

Fig. 1 is a section on line 1—1 of Fig. 2.

Fig. 2 is a top view of the mold conveyer having certain parts broken away in order to facilitate the showing of said conveyer.

Fig. 3 is a detail drawing showing one of the mold supporting trays in top view.

As in other well known mold conveyers two vertical shafts 5 are provided and arranged at a distance from each other. One of said shafts will be driven from some convenient source of power and in some suitable manner, which is not shown or indicated in the drawings because it is not a part of the present invention. On each vertical shaft a sprocket gear 6 is rigidly mounted. A chain 7 is trained around said two sprocket gears. The chain is constructed in the well known manner of combining cast links by steel bars. Each cast link has two cylindrical ends 8, each provided with a bore adapted to receive a bolt or the like. In the center of each link at its lower face, a roller or a wheel 9 is arranged. A rail 10 is located about the two vertical shafts in the manner indicated in Figure 2 and the rail is supported by a plurality of supporting ties 11.

A plurality of trays is arranged to support the molds. Each tray consists of a platform 12, which is supported by a lever arm 13, which actually consists of two forks or branches. Each arm has at its outer portion a triangular shaped plate or support 14 upon which the tray proper may be arranged and is held in place by means of countersunk bolts 15 or the like. From this supporting plate, two arms 16 extend inwardly and downwardly and then horizontally and toward each other as indicated at 17. At the inner end of the arm a sleeve 18 is provided adapted to receive a bolt or short shaft 19, on which a roller 20 is rotatably mounted.

Adjacent each place where the horizontal portions of the arm adjoin the portions extending inwardly and downwardly the arm is provided with two openings adapted to permit the entrance of a bolt or the like. The cross section of the arms is preferably U-shaped. The distance between the horizontal portions of the arms and between the holes therein is such, the bolts which will be inserted through the sleeve portions of the chain links may enter and extend through the holes in the tray arms so that the tray will be carried in this manner by the chain.

It is easily understood that the chain, onto which a plurality of trays is fastened in the indicated manner, would carry said trays along with it when the chain would be set in motion by rotating one of the sprocket gears 6, because the wheels 9 rest on the rail 10 and roll along this rail supporting thereby the chain which in turn as stated above carries the trays.

When however the trays will be loaded with the molds and the molds would come into the pouring zone, the load on the tray would be too great to be carried in the indicated manner. In order to overcome this disadvantage the rollers 20 are provided on the inner end of the arm and will be utilized in the following manner. Angle irons 21 are fastened by means of rivets or the like to the supporting channels 11 and extend upwardly therefrom. Each pair of angle irons 22 carry on their outer ends another angle iron 23, and this angle iron extends all around the upper edge of the construction following the contour of the rail 10. A plate 24 is fastened to the angle iron 23 and carried thereby, and the outer part of said plate is bent downwardly as indicated at 25 whereby said portion of the plate will extend downwardly beyond the links of the conveyer chain protecting said chain against entrance of foreign matter.

The bolts extending through the links of the chain and through the arms of the trays will extend beyond the upper parts of the chain and carry on this part rollers 26. These rollers are located between the downwardly extending leg of the angle 23 and the downwardly bent portion 25 of the plate 24 and are arranged in such a manner that the rollers will be guided between the two parts, thereby eliminating a sideward movement of the chain, holding the same always in upright position and enabling it to move on its supporting wheels without any friction which would be caused by the chain or any part thereof getting into frictional contact with some other parts. The middle portion 27 of the top plate 24 may be made removable in order to make it possible to get onto the parts of the chain and the like. For this purpose angle irons 28 are fastened to the top plate and the loose portion 27 rests then on these angle irons. Adjacent the supporting channels 11 angle irons 29 are fastened to the upright angle irons 21 and following the outline of the rail all around the device. These irons are arranged so that the rollers 20 on the inner ends of the tray arms 13 will abut the horizontal legs of these angle irons, thereby balancing the trays, when as indicated before, the molds are placed on the trays and are filled.

In order to protect the chain and other movable parts against damage by spilling hot metal, a bent plate 30 may be fastened to the downwardly extending part 25 of the cover plate and fire clay may be put onto the said bent plate and the cover plate as indicated at 31 in Fig. 1. This precaution is only necessary in the pouring zone proper and possibly in the immediate neighborhood thereof.

It is easy to see that the mold conveyer will fulfill all the objects mentioned in the introduction and many others not specifically mentioned.

What I claim as new and desire to secure by Letters Patent is:

1. In a mold conveyer of the class described, an endless chain, a pair of vertical shafts, a sprocket gear on each shaft, said endless chain being trained around said sprocket gears, an endless track, wheels on said chain adapted to roll on said track and to support the chain, a plurality of levers fastened to the chain and extending crosswise thereof, a tray adapted to support a mold and fastened to the outer end of said lever, a cover plate extending over the two sprocket gears and over the endless chain, a frame supporting said cover plate, means on the inner edge and of each lever adapted to engage a member of said frame for balancing the load on said tray, and means for securing the chain in upright position.

2. In a mold conveyer of the class described, a pair of vertical shafts, a sprocket gear on each shaft, an endless track surrounding the two shafts, an endless chain trained around the two sprocket gears, a plurality of wheels on said chain and adapted to roll on said endless track, a cover plate extending over the two sprocket gears and beyond the endless chain, the outer portion of said cover plate being bent downwardly, a plurality of levers fastened to the chain and extending crosswise thereof, a tray on the outer end of each lever, and a roller on the inner end thereof, a frame to support the cover plate, the roller on the end of the lever engaging a member of said frame in order to balance the load on the outer end of the lever.

3. In a mold conveyer of the class described a pair of vertical shafts, a sprocket gear on each shaft, an endless chain trained around said gears, an endless track surrounding both shafts, a plurality of wheels on said chain and adapted to roll on said track, a cover plate extending over the two gears and the chain, the outer part of said cover plate being bent downwardly to extend adjacent the chain, a frame for the cover plate, a plurality of rollers arranged on the upper part of the chain and adapted to engage a member of said frame.

4. In a mold conveyer of the class described two vertical shafts, a sprocket gear on each shaft, an endless chain trained around said sprocket gears, an endless track surrounding both vertical shafts, a plurality of wheels arranged on the lower part of the chain and adapted to roll on said track, a cover plate extending over the two sprocket gears and over the endless chain, the outer part of said plate being bent downwardly to extend adjacent and outward of said chain, a frame to carry said cover plate, a plurality of angle irons forming said frame, a plurality of levers extending crosswise of chain and fastened thereto, a tray on the outer end of each lever, a roller on the inner end of each lever arranged to rotate in a vertical plane and adapted to engage one of said angle irons forming the frame, and a plurality of rollers located on the upper part of the chain, carried thereby, arranged to rotate in a horizontal plane and adapted to engage another member of said frame.

5. In a mold conveyer of the class described, two vertical shafts spaced from each other, a sprocket gear on each shaft, an endless chain trained around said gears, an endless track surrounding both vertical shafts, a plurality of wheels attached to the lower part of the chain and adapted to roll on said track, the cover plate extending over the two sprocket gears and the endless chain, the outer portion of said plate being bent downwardly, a frame to support said cover plate, a plurality of levers carried by said chain and extending crosswise thereof, a tray on the outer end of each lever, a roller on the inner end of each lever adapted to engage a member of said frame, a plurality of rollers arranged on the upper part of the endless chain and adapted to engage another member of said frame, and means arranged between said plate, said trays and said lever for preventing foreign matter to enter in between these parts.

In witness whereof I affix my signature.

PAUL F. KRENZKE.